Patented Sept. 5, 1939

2,171,806

UNITED STATES PATENT OFFICE 2,171,806

TANNING MATERIAL

Alfred Russell and John W. Copenhaver, Philadelphia, Pa., assignors to Röhm & Haas Company, Philadelphia, Pa.

No Drawing. Application August 26, 1937, Serial No. 161,066

7 Claims. (Cl. 260—49)

This invention relates to the preparation of synthetic tanning materials suitable for making white leather, for bleaching chrome leather or for retanning leather already made by other means. More particularly the invention relates to a new tanning material made by condensing 4,4'-dihydroxy diphenyl sulfone sulfonate with formaldehyde.

Condensation products of dihydroxy diphenyl sulfone and formaldehyde when prepared without the introduction of a hydrophilic group are water-insoluble compounds that as such are without value as tanning materials. Several processes have been proposed whereby the necessary hydrophilic group may be introduced either concurrently with or subsequent to condensation. Most frequently this has been accomplished by condensing the dihydroxy diphenyl sulfone with formaldehyde in the presence of an aromatic sulfonic acid that is also condensable with formaldehyde or by heating the still reactive, two component condensate with the aromatic sulfonate. In French Patent No. 528,803 it is proposed to sulfonate the dihydroxy sulfone using one mol of 98% sulfuric acid per mol of dihydroxy diphenyl sulfone and to condense thereafter the neutralized sulfonic derivative with formaldehyde and sodium phenol sulfonate.

We have found that heating one mol of dihydroxy diphenyl sulfone with one mol of sulfuric acid as proposed in the French patent does not result in any appreciable sulfonation, but that if more drastic sulfonating conditions are used as, for instance, using chlorosulfonic acid as sulfonating agent or heating the one mol of dihydroxy diphenyl sulfone with three or more, preferably three and one-half, mols of 98% sulfuric acid at a temperature above 110° C., water-soluble dihydroxy diphenyl sulfone sulfonates are formed which can be condensed with formaldehyde in the absence of phenol sulfonic acid or other aromatic sulfonate to give a water-soluble product that is much superior as a tanning material to the products heretofore prepared.

In carrying out our invention dihydroxy diphenyl sulfone is first sulfonated to either the monosulfonate

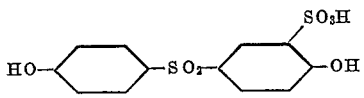

or the disulfonate

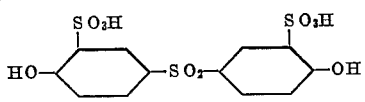

or to a mixture thereof by either of the above-indicated methods or any other method capable of producing a water-soluble dihydroxy-diphenyl sulfone sulfonate. When sulfuric acid is used as the sulfonating agent, at least three mols of at least 98% acid should be used for each mol of dihydroxy diphenyl sulfone and the reaction carried out at at least 110° C. A temperature much above 115° C. should be avoided, however, as it may lead to charring and decomposition of the sulfone.

The condensation with formaldehyde or other aldehyde is preferably carried out in aqueous solution, i. e., a concentrated solution of the dihydroxy diphenyl sulfone sulfonate is formed and aqueous formaldehyde used. Conveniently this is accomplished by adding the aqueous formaldehyde slowly to a heated aqueous solution of the dihydroxy diphenyl sulfone sulfonate but, if desired, the two may be mixed cold and the mixture then heated to reaction temperature. After the reaction is complete, the reaction mass is cooled, neutralized to the desired pH and diluted with water to the desired concentration.

Leather tanned with the material as thus prepared is pure white and of greater importance has a much higher resistance to sunlight than leather produced by any synthetic tanning agent at present in use. Very little change can be seen even after five hours' exposure to bright sunlight, a test which results in marked discoloration of leather tanned with synthetic tanning materials made from ordinary phenols.

To further illustrate the invention, the following examples are given, but it should be understood that the invention is not confined to the particular details thereof.

Example 1

80 parts by weight of chlorosulfonic acid was stirred and to it 50 parts of 4,4'-dihydroxy diphenyl sulfone was added portion-wise over ten to fifteen minutes. The viscous reaction mixture was then heated to a temperature of 50° to 60° C. for about fifteen minutes or until a test portion dissolved to a clear solution in water. To the reaction mixture 40 parts of water was then cautiously added to decompose the excess chloro-sulfonic acid and dilute the reaction mixture somewhat. The whole was then heated to a temperature of approximately 95° C. and 8 parts of 37% aqueous formaldehyde added slowly over approximately ten minutes while stirring vigorously. After all the formaldehyde was added, the mixture was stirred at the same temperature for a further thirty minutes. The whole was then cooled, diluted somewhat, partly neutralized with 34 parts of caustic soda and finally diluted with water to a total of 520 parts.

Example 2

50 parts by weight of 4,4'-dihydroxy diphenyl sulfone was sulfonated as described in Example 1. To the reaction mixture 80 parts of water was added and the solution heated to the boiling temperature. 10 parts of 37% aqueous formaldehyde was added and the solution boiled under reflux for six hours. The whole was then cooled, partially diluted, partially neutralized with 34 parts of caustic soda and finally diluted to a total of 520 parts as in Example 1.

*Example 3*

To 50 parts of a 4,4'-dihydroxy diphenyl sulfone, sulfonated as described in Example 1, 24 parts of water and 16 parts of 37% aqueous formaldehyde were added and the solution heated at 95° C. for ninety minutes. The preparation was then finished as described in Example 1.

*Example 4*

50 parts by weight of 4,4'-dihydroxy diphenyl sulfone was added to 70 parts by weight of 98% sulfuric acid and the reaction mixture heated at 110° to 115° C. for from ten to fifteen minutes or until a test portion dissolved to a clear solution in water. The clear syrup obtained was diluted with 90 parts of water and heated to 98° to 100° C. 10 parts of 37% aqueous formaldehyde was then added slowly and the solution maintained at 95° C. for four hours. The reaction mixture was then cooled, diluted and neutralized as in Example 1 and finally diluted to a total of 520 parts.

*Example 5*

To 50 parts of 4,4'-dihydroxy diphenyl sulfone, sulfonated as described in Example 4, 60 parts of water and 10 parts of 37% aqueous formaledhyde were added. The reaction mixture was heated to 98° to 100° C. for two and one-half hours and the preparation finished as described in Example 1.

The condensation products obtained in each of these examples are excellent tanning agents that may be used alone or in combination with other tanning materials for the preparation of white leather, or they may be used to bleach chrome leather, or for retanning leather made by other means. Because of the omission of third reactants such as phenol sulfonic acids, etc. the color stability that characterizes the dihydroxy diphenyl sulfone-formaldehyde resins, but which is notoriously poor in other phenol-formaldehyde resins, is retained at its maximum in the new synthetic tan and, as a result, white leather made with these materials remains a pure white even after long exposure to the direct rays of the sun.

Variations in the proportions of ingredients, the time and temperature of reaction and in other details of the invention will occur to those skilled in the art. A wide range such as from 0.5 to 3 mols of formaldehyde to one mol of dihydroxy diphenyl sulfone may be used and the time and temperature of reaction can be varied from thirty minutes to many hours and from 40° C. to above the boiling point of the reaction mixture. In general, we prefer to use from one-half to one mol of formaldehyde to one mol of dihydroxy diphenyl sulfone sulfonate and a reaction temperature between 85° C. to the boiling point of the reaction mixture, preferably 98° to 100° C., but other ratios and times can be used without departing from the principle on which the invention is based.

We claim:

1. In the process of preparing a tanning material, the steps consisting of sulfonating at least one aromatic nucleus of 4,4'-dihydroxy diphenyl sulfone to form a water-soluble product and condensing the sulfonated product with an aldehyde.

2. In the process of preparing a tanning material, the steps consisting of sulfonating at least one aromatic nucleus of 4,4'-dihydroxy diphenyl sulfone to form a water-soluble product and condensing the sulfonated product with formaldehyde.

3. In a process of preparing a tanning material, the steps consisting of treating 4,4'-dihydroxy diphenyl sulfone with approximately three and one-half molecular equivalents of approximately 98% sulfuric acid at a temperature above 110° C. until a water-soluble product forms, and condensing the water-soluble product with from one-half to one molecular equivalent of an aldehyde.

4. In a process of preparing a tanning material, the steps consisting of treating 4,4'-dihydroxy diphenyl sulfone with approximately three and one-half molecular equivalents of approximately 98% sulfuric acid at a temperature above 110° C. until a water-soluble product forms, and condensing the water-soluble product with from one-half to one molecular equivalent of formaldehyde.

5. A process which consists in condensing 4,4'-dihydroxy diphenyl sulfone sulfonic acid with formaldehyde.

6. A synthetic tanning material which in the acidic form consists of the condensation product of 4,4'-dihydroxy diphenyl sulfone sulfonic acid and an aldehyde.

7. A synthetic tanning material which in the acidic form consists of the condensation product of 4,4'-dihydroxy diphenyl sulfone sulfonic acid and formaldehyde.

ALFRED RUSSELL.
JOHN W. COPENHAVER.